United States Patent
Asano et al.

(10) Patent No.: US 6,922,484 B2
(45) Date of Patent: Jul. 26, 2005

(54) INFORMATION PRESENTATION APPARATUS AND INFORMATION PRESENTATION METHOD

(75) Inventors: Takeo Asano, Kunitachi (JP); Yuichiro Akatsuka, Tama (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 639 days.

(21) Appl. No.: 10/132,412

(22) Filed: Apr. 25, 2002

(65) Prior Publication Data

US 2002/0172415 A1 Nov. 21, 2002

(30) Foreign Application Priority Data

Apr. 25, 2001 (JP) ........................................ 2001-128003

(51) Int. Cl.[7] ................................................ G06K 9/00
(52) U.S. Cl. ....................................... 382/154; 345/419
(58) Field of Search ................................ 382/100, 103, 382/106, 154; 345/418, 419, 420; 356/12; 348/42, 584; 353/28

(56) References Cited

U.S. PATENT DOCUMENTS

| | | | | |
|---|---|---|---|---|
| 6,147,716 A | * | 11/2000 | Ohki et al. ................. | 348/584 |
| 6,554,431 B1 | * | 4/2003 | Binsted et al. .............. | 353/28 |
| 6,640,004 B2 | * | 10/2003 | Katayama et al. .......... | 382/154 |

FOREIGN PATENT DOCUMENTS

JP 2002-8043 A * 1/2002 ............ G06T/7/20

OTHER PUBLICATIONS

Takahashi, A., et al., "A High Accuracy Realtime 3D Measuring Method of Marker for VR Interface by Monocular Vision", 3D Image Conference '96, pp. 167–172.
Neumann, U., et al., Chapter 6, "Augmented Reality Tracking in Natural Environments", Augmented Reality Tracking in Natural Environments, 6.3 Outdoor Tracking, pp. 101–130.

* cited by examiner

*Primary Examiner*—Vikkram Bali
(74) *Attorney, Agent, or Firm*—Scully, Scott, Murphy & Presser

(57) ABSTRACT

An information presentation apparatus comprises a three-dimensional model data recording apparatus. A projection apparatus projects a marker whose three-dimensional position/posture relation with a photography object is known onto the photography object. An image input apparatus inputs the photography object on which the marker is projected. A position detection apparatus uses the position of the marker in an image to detect a relative position relation between the photography object and the image input apparatus. A display apparatus uses the position of the photography object to superpose and display three-dimensional model data of the photography object upon the image of the photography object so that the position of the image of the photography object coincides with the position of the three-dimensional model data.

20 Claims, 2 Drawing Sheets

INFORMATION PRESENTATION APPARATUS AND INFORMATION PRESENTATION METHOD

CROSS-REFERENCE TO RELATED APPLICATIONS

This application is based upon and claims the benefit of priority from the prior Japanese Patent Application No. 2001-128003, filed Apr. 25, 2001, the entire contents of which are incorporated herein by reference.

BACKGROUND OF THE INVENTION

1. Field of the Invention

The present invention relates to an information presentation apparatus and information presentation method.

2. Description of the Related Art

A technique of using a plurality of markers to calculate and obtain position/posture information of an image input apparatus has heretofore been proposed. A proposer, et al. has already proposed a system in which information included in a reference marker is read in order to obtain a general position/posture of an image acquisition section, and positions of the reference marker and a marker and/or a characteristic point disposed around the reference marker can be recognized as a "related information presentation apparatus and related information presentation method". Here, the positions of four or more markers and/or characteristic points are recognized, and the information can be used to estimate the position/posture of the image input apparatus.

A method for obtaining the position/posture of the image input apparatus from a reference marker position is described in "High-Precision Real Time Estimating Method of Position/Posture of Rectangular Marker by Single Lens for VR Interface" (3D Image Conference '96 Proceedings pp. 167–172 Akira Takahashi, Ikuo Ishii, Hideo Makino, Makoto Chujo 1996). That is, assuming that Oc is a point of view, po is a projected image diagonal intersection, and Po is a rectangle diagonal intersection, x' is obtained so as to minimize the following and the posture is obtained.

$$F(x') \cdot 4 \cdot \sum_{i=1}^{4} (n_i n_i')^2$$

Here, a variable vector x' is as follows.

$$x' \cdot ('_1 \cdot '_1 ',_2')$$

For the position, d is estimated by a least square method such that a distance between Ocpi and a vertex Pi is minimized.

$$d \cdot \frac{(S_0 S_i)(S_i W_i) \cdot (S_0 W_i)}{1 \cdot (S_0 S_i)^2} D$$

Subsequently, the position can be determined by an average of depth values obtained from respective vertexes.

Moreover, in "Mixed Reality" (ISBN 4-274-90283-8 Ohmsha, Ltd.) Chapter 6: Augmented Reality Tracking in Natural Feature Environments, U. Neumann, S. You, Y. Cho, J. Lee and J. Park 1999 p.101–130, a known reference point called Fiducial Mark is used to obtain the initial position of the image input apparatus. In this case, a plurality of characteristic points are extracted to obtain a projection position in an input image. The characteristic point is tracked in accordance with the movement of the input apparatus, and an optimum solution of the position of the image input apparatus is obtained.

In a conventional example, a technique is disclosed for obtaining the position/posture information of the image input apparatus, when the positions of a plurality of markers are known. However, for example, when an environment for using the apparatus extends over a broad range, it is necessary to prepare a large number of markers beforehand in the entire range for use.

When a plurality of pieces of information are to be presented at the same time, at least the markers for the presented information have to be prepared. When a sufficient space for disposing the makers can be secured, there is no problem. However, in the environment in which the installation space is limited, there is possibility that the present technique cannot be used.

BRIEF SUMMARY OF THE INVENTION

Therefore, an object of the present invention is to provide an information presentation apparatus and information presentation method in which an image is projected on an apparatus side, and the position/posture of an image input apparatus can be estimated by using a smaller number of markers and without disposing the markers beforehand.

To achieve the above-described object, according to a first aspect of the present invention, there is provided an information presentation apparatus comprising:

a three-dimensional model data recording apparatus in which three-dimensional model data of a photography object is recorded;

a projection apparatus to project a marker whose three-dimensional position/posture relation with the photography object is known onto the photography object;

an image input apparatus to input the photography object on which the marker is projected;

a position detection apparatus which uses the position of the marker in an image inputted by the image input apparatus to detect a relative position relation between the photography object and the image input apparatus; and a display apparatus which uses the position of the photography object obtained by the position detection apparatus to superpose and display three-dimensional model data of the photography object in the three-dimensional model data recording apparatus upon the image of the photography object inputted by the image input apparatus so that the position of the image of the photography object coincides with the position of the three-dimensional model data.

Moreover, according to a second aspect of the present invention, there is provided an information presentation apparatus comprising:

three-dimensional model data recording means in which three-dimensional model data of a photography object is recorded;

projection means for projecting a marker whose three-dimensional position/posture relation with the photography object is known onto the photography object;

image input means for inputting the photography object on which the marker is projected;

position detection means for using the position of the marker in an image inputted by the image input means to detect a relative position relation of the photography object with the image input means; and display means for using the position of the photography object obtained by the position detection means to superpose and display the three-dimensional model data of the photography object in the three-dimensional model data recording means upon the image of the photography object inputted by the image input means so that the position of the image of the photography object coincides with the position of the three-dimensional model data.

Furthermore, according to a third aspect of the present invention, there is provided an information presentation method comprising:

a step of projecting a marker whose three-dimensional position/posture relation with a photography object is known upon the photography object;

a step of inputting the photography object on which the marker is projected;

a step of using a position of the marker in an inputted image to detect the position of the photography object; and a step of using the detected position of the photography object to superpose and display pre-recorded three-dimensional model data upon the inputted image of the photography object so that the position of the image of the photography object coincides with the position of the three-dimensional model data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
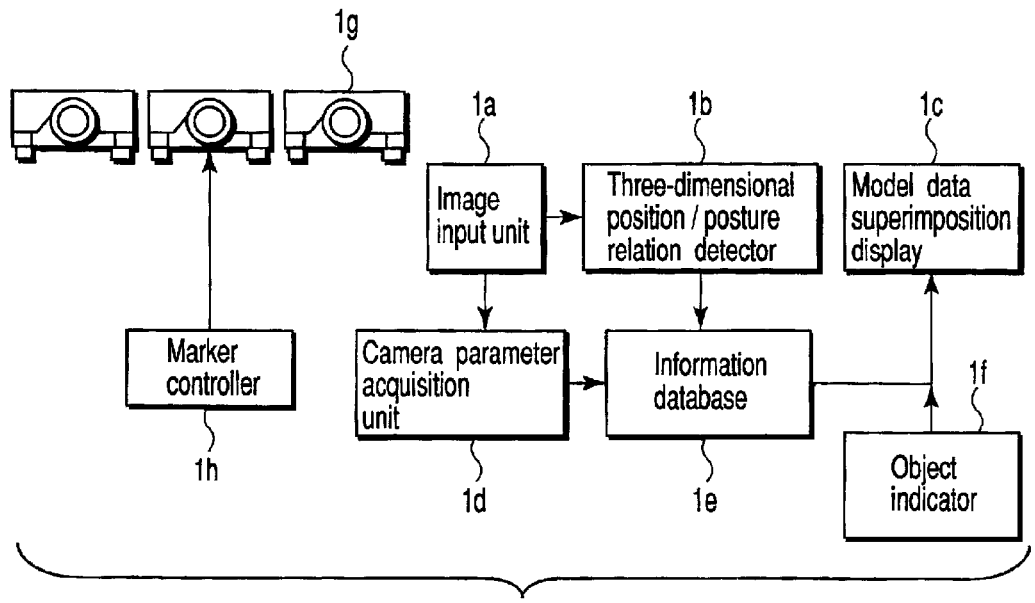
FIG. 1 is a block diagram showing a constitution of an information presentation apparatus according to an embodiment of the present invention.

Embodiments of the present invention will be described hereinafter in detail with reference to the drawings.
(First Embodiment)
FIGS. 1 and 2 are block diagrams showing a constitution of an information presentation apparatus according to an embodiment of the present invention.

Reference numeral $1a$ denotes an image input unit (image input apparatus), $1b$ denotes a three-dimensional position/posture relation detector (position detection apparatus), $1c$ denotes a model data superimposition display (display apparatus), $1d$ denotes a camera parameter acquisition unit, $1e$ denotes an information database (three-dimensional model data recording apparatus), $1f$ denotes an object indicator, $1g$ denotes a projector (projection apparatus), and $1h$ denotes a marker controller.

First in a constitution example shown in FIG. 1, an output of the image input unit $1a$ is connected to the three-dimensional position/posture relation detector $1b$ and camera parameter acquisition unit $1d$, and outputs of the three-dimensional position/posture relation detector $1b$ and camera parameter acquisition unit $1d$ are connected to an input of the information database $1e$. Moreover, the outputs of the information database $1e$ and object indicator $1f$ are connected to the input of the model data superimposition display $1c$.

Figure 2:
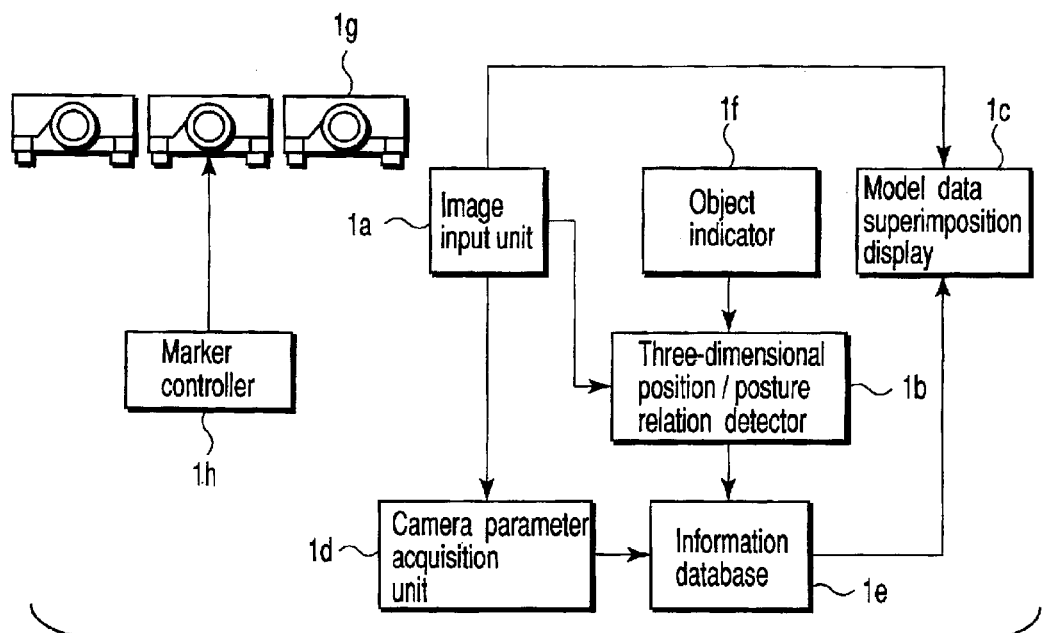
FIG. 2 is a block diagram showing the constitution of the information presentation apparatus according to the embodiment of the present invention.

Moreover, in another constitution example shown in FIG. 2, the output of the image input unit $1a$ is connected to the inputs of the three-dimensional position/posture relation detector $1b$, model data superimposition display $1c$, and camera parameter acquisition unit $1d$, and the outputs of the three-dimensional position/posture relation detector $1b$ and camera parameter acquisition unit $1d$ are connected to the input of the information database $1e$. The output of the information database $1e$ is connected to the input of the model data superimposition display $1c$. Additionally, the output of the object indicator $1f$ is connected to the input of the three-dimensional position/posture relation detector $1b$.

Here, in the constitution of FIG. 1, an object is two-dimensionally pointed by the object indicator $1f$ on a display screen of the model data superimposition display $1c$ and desired data is obtained (displayed). In the constitution of FIG. 2, some pointing device (laser pointer, and the like) (not shown) is used to indicate a target in a three-dimensional coordinate, that is, a real space.

In the above-described constitution, a marker whose three-dimensional position/posture relation with the object is known is projected onto the object by the projector $1g$. The object on which the marker is projected is inputted as an image in the present apparatus via the image input unit $1a$. The three-dimensional position/posture relation detector $1b$ uses the position of the marker on the image to obtain the position/posture relation between the object and the image input unit $1a$. Moreover, the model data superimposition display $1c$ superimposes/displays the three-dimensional model data of the object upon the image with a position/posture/size/direction based on the above-described calculation result. In this case, for the marker projected by the projector $1g$, the marker controller $1h$ selects a timing of projection, and a marker shape to be projected, and sends a projected image to the projector $1g$.

Figure 3:
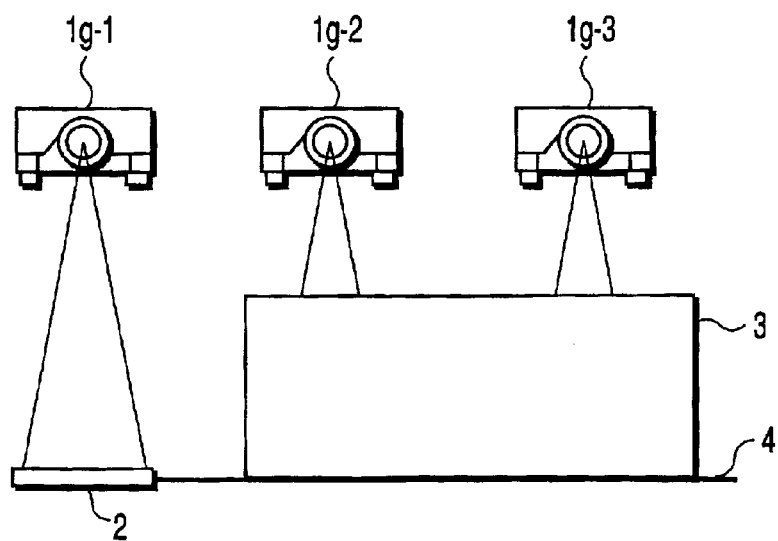
FIG. 3 is an explanatory view of situations of marker projection in the presence of a shield object.

The marker is projected by a plurality of projectors. This solves a problem that a marker 2 is not projected on the object in a case in which there is an obstruction (shield object) 3 on light fluxes of a plurality of projectors $1g$-1 to $1g$-3 shown in FIG. 3. The projectors $1g$-1 to $1g$-3 are disposed so that respective projection directions differ. Even when the light flux of any projector is shielded, the marker 2 is projected onto the object by the other projectors, and the data inputted into the three-dimensional position/posture relation detector $1b$ is not deteriorated. Reference numeral 4 denotes an object position.

Figure 4:
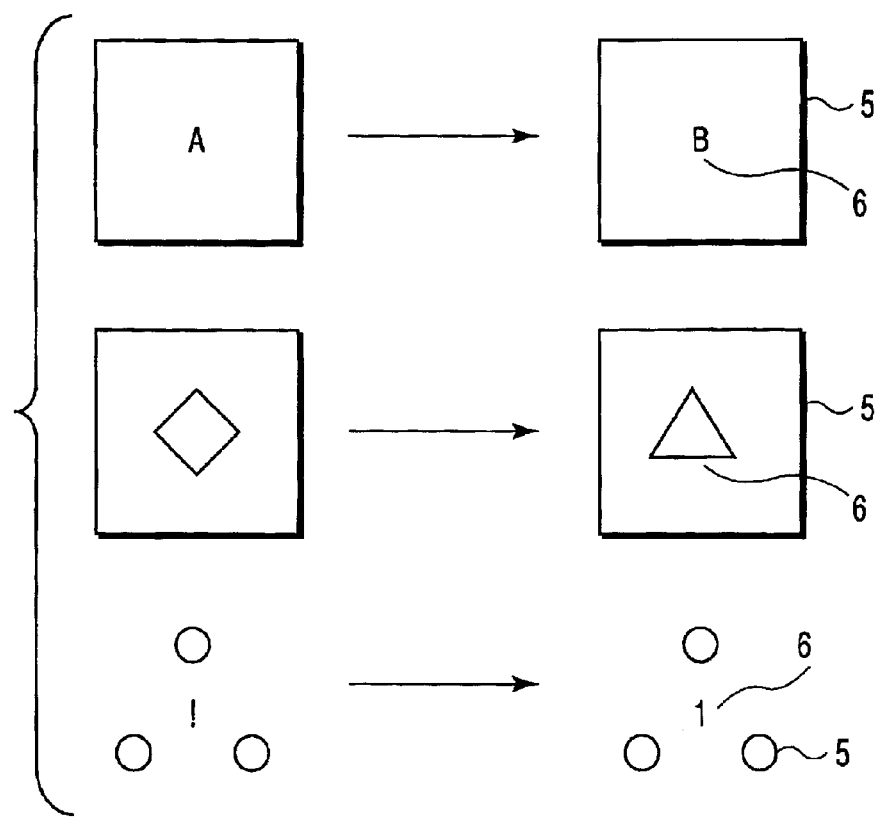
FIG. 4 is an explanatory view of a projection method of a marker.

FIG. 4 is a diagram showing a projection state of the marker. As described above, in the present embodiment, the marker projected by the projector is not always constant during use of the apparatus, and many shapes of markers are projected from the same projector in a set timing. In information presentation using the marker, a pattern of the marker has a one-to-one relation with linked information. When a plurality of pieces of information are to be presented, the shape of the marker is changed. However, in this case, in a situation in which the installation place of the marker is limited, it is difficult to present a plurality of pieces of information. Moreover, many markers are present in a field of view, the image to be observed is very difficult to see, and other problems occur.

Therefore, as shown in FIG. 4, the projected marker is changed with time. A plurality of markers are successively projected in one projection area. When the same marker is simply observed, a plurality of pieces of information can be presented.

FIG. 4 shows one example of the present marker. The marker 2 is constituted of two categories: a frame 5 and internal character 6. The frame 5 outside the character is shaped to have points of corners so that a three-dimensional position/posture relation can easily be detected. The image is shaped such that it is easy to geometrically define the points. Error factors in calculating the information of the three-dimensional position/posture relation can be minimized.

Furthermore, the character 6 drawn in the frame 5 is set to have one-to-one relation with information to be superimposed/displayed and registered in the information database 1e. When the character 6 is recognized, the projection to be presented is determined in one meaning.

In the marker projection, the frame 5 and character 6 are simultaneously projected, but the image of the frame 5 does not change, and the internal character 6 changes. Thereby, the information of the three-dimensional position/posture relation does not change, and only the information obtained from the information database 1e is changed. It is therefore possible to display more information in the observation image with a high precision.

The marker 2 is projected by the projector 1g in this manner, and it is possible to freely dispose the marker 2 over a transparent material such as glass through which the projection light flux is transmitted. Additionally, when a degree of refraction of light is considered in this situation, it is also possible to project the marker 2 into an isolated chamber or a water tank. It is possible to broadly expand an application range of the present invention.

The embodiment of the present invention has been described above, but the present invention is not limited to this, and the present invention can variously be modified or improved within a range without departing from the scope.

According to the present invention, there is provided an information presentation apparatus in which the image is projected on the apparatus side and the position/posture of the image input apparatus can be estimated at a high speed by using a smaller number of markers and without disposing the marker beforehand.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An information presentation apparatus comprising:
    a three-dimensional model data recording apparatus in which three-dimensional model data of a photography object is recorded;
    a projection apparatus to project a marker whose three-dimensional position/posture relation with said photography object is known onto said photography object;
    an image input apparatus to input said photography object on which said marker is projected;
    a position detection apparatus which uses the position of the marker in an image inputted by the image input apparatus to detect a relative position relation between said photography object and said image input apparatus; and
    a display apparatus which uses the position of said photography object obtained by said position detection apparatus to superpose and display three-dimensional model data of said photography object in said three-dimensional model data recording apparatus upon the image of said photography object inputted by said image input apparatus so that the position of the image of said photography object coincides with the position of said three-dimensional model data.

2. The information presentation apparatus according to claim 1, wherein said projection apparatus includes a plurality of marker projectors which project said marker onto said photography object from different positions.

3. The information presentation apparatus according to claim 2, wherein said projection apparatus selects the projector which projects said marker from said plurality of projectors, and projects said marker onto said photography object.

4. The information presentation apparatus according to claim 3, wherein said selected projector which projects said marker is switched with an elapse of time.

5. The information presentation apparatus according to claim 1, wherein said marker projected onto said photography object is constituted of a frame and a character or a figure projected inside the frame.

6. The information presentation apparatus according to claim 5, wherein the character or the figure of said marker is associated with the three-dimensional model data of said photography object in a one-to-one correspondence and is recorded in said three-dimensional model data recording apparatus.

7. The information presentation apparatus according to claim 5, wherein only the character or the figure projected inside an outer frame is switched without changing the outer frame for said marker projected onto said photography object.

8. The information presentation apparatus according to claim 5, wherein three-dimensional position/posture information of said photography object is detected by the frame of said marker projected on said photography object, and information of said character or said figure is used to select said three-dimensional model data to be superimposed/displayed from said three-dimensional model data recording apparatus.

9. The information presentation apparatus according to claim 3, wherein a plurality of projectors of said projection apparatus are connected to a marker control apparatus, and the marker projected onto said photography object is switched by said marker control apparatus.

10. The information presentation apparatus according to claim 1, which is connected to said display apparatus to indicate a part of said photography object displayed on a screen of the display apparatus, and superimposes/displays the selected three-dimensional model data on the image of said photography object.

11. An information presentation apparatus comprising:
    three-dimensional model data recording means in which three-dimensional model data of a photography object is recorded;
    projection means for projecting a marker whose three-dimensional position/posture relation with said photography object is known onto said photography object;

image input means for inputting said photography object on which said marker is projected;

position detection means for using the position of the marker in an image inputted by the image input means to detect a relative position relation of said photography object with said image input means; and display means for using the position of said photography object obtained by said position detection means to superpose and display the three-dimensional model data of said photography object in said three-dimensional model data recording means upon the image of said photography object inputted by said image input means so that the position of the image of said photography object coincides with the position of said three-dimensional model data.

12. The information presentation apparatus according to claim 11, wherein said projection means includes a plurality of marker projectors which project said marker onto said photography object from different positions.

13. The information presentation apparatus according to claim 12, wherein said projection means selects the projector which projects said marker from said plurality of projectors, and projects the marker onto said photography object.

14. The information presentation apparatus according to claim 13, wherein said selected projector which projects the marker is switched with an elapse of time.

15. The information presentation apparatus according to claim 11, wherein said marker projected onto said photography object is constituted of a frame and a character or a figure projected inside the frame.

16. An information presentation method comprising:

a step of projecting a marker whose three-dimensional position/posture relation with a photography object is known upon the photography object;

a step of inputting said photography object on which said marker is projected;

a step of using a position of said marker in an inputted image to detect the position of said photography object; and a step of using the detected position of said photography object to superpose and display pre-recorded three-dimensional model data upon the image of said inputted photography object so that the position of the image of said photography object coincides with the position of said three-dimensional model data.

17. The information presentation method according to claim 16, wherein the step of projecting the marker onto said photography object comprises: selecting a projector which projects the marker from a plurality of projectors disposed in different positions; and projecting the marker onto said photography object.

18. The information presentation method according to claim 17, further comprising: switching the projector which projects the selected marker with an elapse of time.

19. The information presentation method according to claim 16, wherein the marker projected on said photography object is constituted of a frame and a character or a figure projected inside the frame.

20. The information presentation method according to claim 19, further comprising: switching only the character or the figure projected inside an outer frame without changing the outer frame in the marker projected onto said photography object.

* * * * *